United States Patent [19]
Fee

[11] Patent Number: 5,600,467
[45] Date of Patent: Feb. 4, 1997

[54] METHOD AND APPARATUS FOR REDUCING HARMONIC INTERFERENCE ON MULTIPLEXED OPTICAL COMMUNICATION LINES

[75] Inventor: John A. Fee, Plano, Tex.

[73] Assignee: MCI Communications Corp., Washington, D.C.

[21] Appl. No.: 490,416

[22] Filed: Jun. 14, 1995

[51] Int. Cl.$^6$ .................................................. H04J 14/02
[52] U.S. Cl. ........................ 359/124; 359/161; 359/110
[58] Field of Search ................................. 359/110, 111, 359/124, 153, 161, 173; 356/303, 319, 320; 324/623, 624

[56] References Cited

U.S. PATENT DOCUMENTS

| | | | |
|---|---|---|---|
| 4,441,181 | 4/1984 | Winzer et al. | 359/130 |
| 4,482,994 | 11/1984 | Ishikawa | 359/129 |
| 4,628,501 | 12/1986 | Loscoe | 359/120 |
| 4,705,530 | 11/1987 | Cheng | 359/238 |
| 4,718,055 | 1/1988 | Winzer | 359/131 |
| 4,747,094 | 5/1988 | Sakaguchi et al. | 359/138 |
| 4,764,980 | 8/1988 | Sakaguchi et al. | 359/177 |
| 4,805,977 | 2/1989 | Tamura et al. | 385/47 |
| 4,821,255 | 4/1989 | Kobrinski | 359/128 |
| 4,945,531 | 7/1990 | Suzuki | 359/133 |
| 4,947,459 | 8/1990 | Nelson et al. | 359/110 |
| 5,101,291 | 3/1992 | Jopson | 359/124 |
| 5,107,359 | 4/1992 | Ohuchida | 359/124 |
| 5,157,652 | 10/1992 | Walker | 359/110 |
| 5,170,451 | 12/1992 | Ohshima | 385/43 |
| 5,195,162 | 3/1993 | Sultan et al. | 385/130 |
| 5,224,183 | 6/1993 | Dugan | 385/24 |
| 5,267,256 | 11/1993 | Saruwatarti et al. | 372/94 |
| 5,281,811 | 1/1994 | Lewis | 250/226 |
| 5,323,268 | 6/1994 | Kikuchi | 359/664 |
| 5,327,516 | 7/1994 | Chraplyvy et al. | 385/123 |
| 5,392,377 | 2/1995 | Auracher | 385/24 |

*Primary Examiner*—Leo Boudreau
*Assistant Examiner*—Kinfe-Michael Negash

[57] ABSTRACT

A system and method to modify in real time the location of carriers in an optical fiber to avoid harmonic interference. Fiber means supply a spectrum of carrier wavelengths. Controller means sweep the entire spectrum of the carrier wavelengths for wanted and unwanted carrier wavelengths. Analyzer means plot wanted carrier signals versus unwanted signals in the spectrum. Control circuit means track the unwanted carrier signals; calculate the amount of spectrum that any or all of the carrier signals must move to avoid unwanted harmonics, and generate a control signal to change carrier frequencies of wanted carriers to avoid harmonics of unwanted carrier signals in the optical fiber.

12 Claims, 3 Drawing Sheets

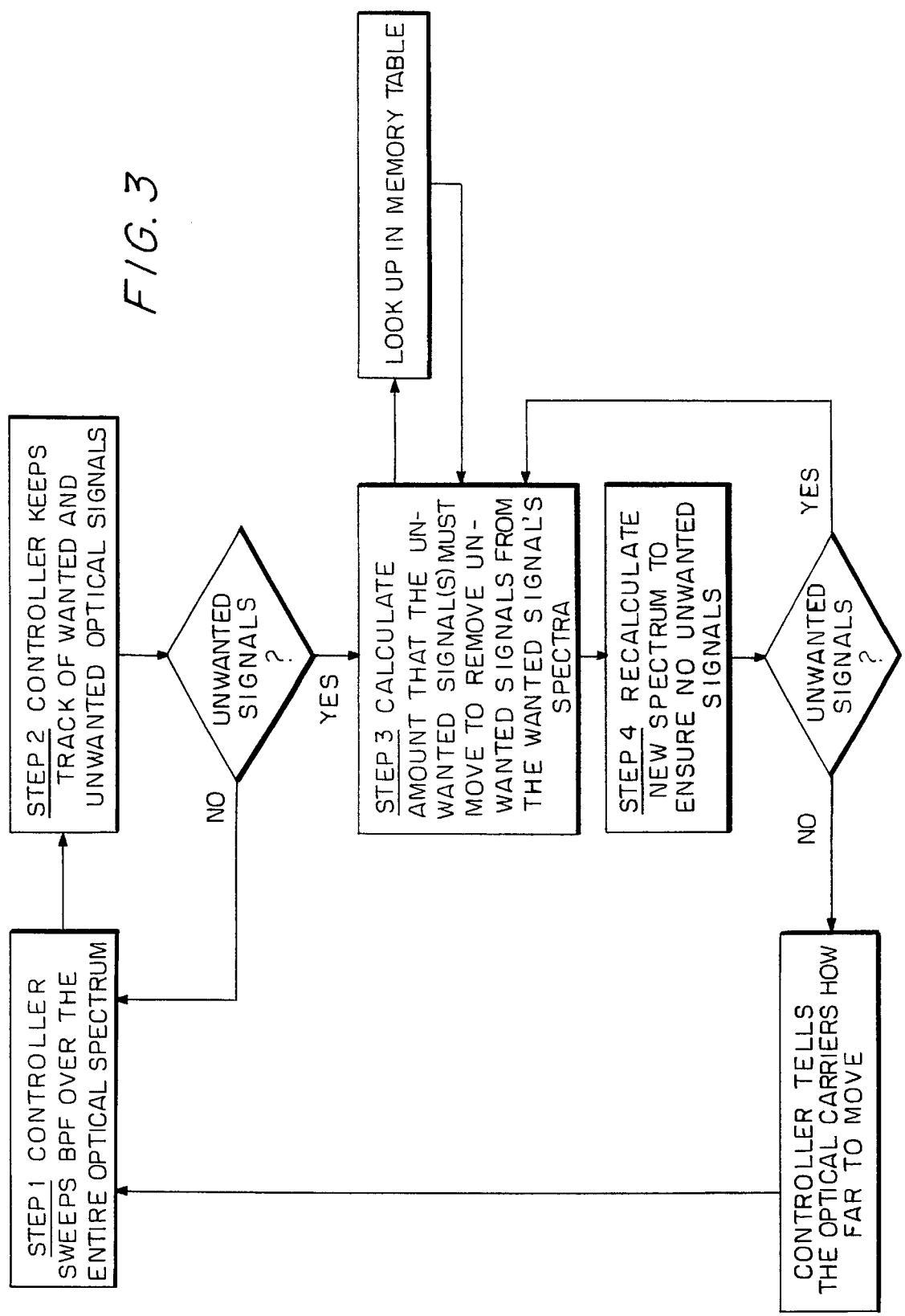

METHOD AND APPARATUS FOR REDUCING HARMONIC INTERFERENCE ON MULTIPLEXED OPTICAL COMMUNICATION LINES

BACKGROUND OF THE INVENTION

1. Field of the Invention

This invention relates to the field of optical communications. More particularly, the invention relates to an optical communication system which uses a plurality of carrier wavelengths on the same optical fiber.

2. Background Information

In optical communication it is desirable to use multiple wavelengths to increase the data bandwidth through an optical channel such as an optical fiber. In such a wavelength multiplexed optical system, where there are several carriers operating within the same optical fiber, there is the possibility that unwanted interferences are formed somewhere in the available optical band. It is well known that the fiber optical medium is non-linear and, while second harmonic distortions produce sums of differences of the traveling wavelengths which tend to lie outside the band of interest, the third harmonic distortion can have an interfering effect within the carrier spectrum, so that severe contamination of a channel by another channel can occur. This is particularly the case for wavelengths synthesized in a wavelength division network and distributed along an optical fiber. Unwanted harmonics within the optical communication channels interfere with the location of present carriers being transmitted as well as interfering with the insertion of a new carrier in the same location of the optical spectrum. It would be desirable to control the location of unwanted harmonics within the optical carrier wavelengths to avoid the existing optical channels and permit the addition of new carriers.

SUMMARY OF THE INVENTION

An object of the present invention is testing an optical communication channel in real time to determine possible conflicts between the channel carriers and their harmonics.

Another object is modifying the locations of some of the carriers in order to avoid harmonic interference.

Another object is enabling more efficient use of the optical spectrum of a communication channel while reducing distortion and interference.

These and other objects, features and advantages are achieved in the present invention in an apparatus and a method for reducing the effects of interfering harmonics within a wavelength multiplexed optical transmission system by moving the operating communication channel(s) to avoid interfering harmonics. The apparatus and method test for the presence of unwanted harmonics in a fiber optic channel, identifies their location within the optical spectrum, and finds optimal placement for the carriers to eliminate the interference of the harmonics existing in the fiber. The movement of carriers is accomplished in the apparatus and method by either generating a higher plurality of carrier wavelengths and selecting an optimal choice of said carriers, or by adjusting the locations of the carriers themselves.

This invention is especially useful where many carriers exist and management of them is necessary. The invention is also useful to regulate the power of the unwanted harmonics by reducing the wanted carrier(s) output power or slightly moving them frequency wise.

BRIEF DESCRIPTION OF THE DRAWING

FIG. 3 is a flow diagram of a method implementing the invention in FIG. 2.

DETAILED DESCRIPTION OF THE PREFERRED EMBODIMENT

Figure 1:
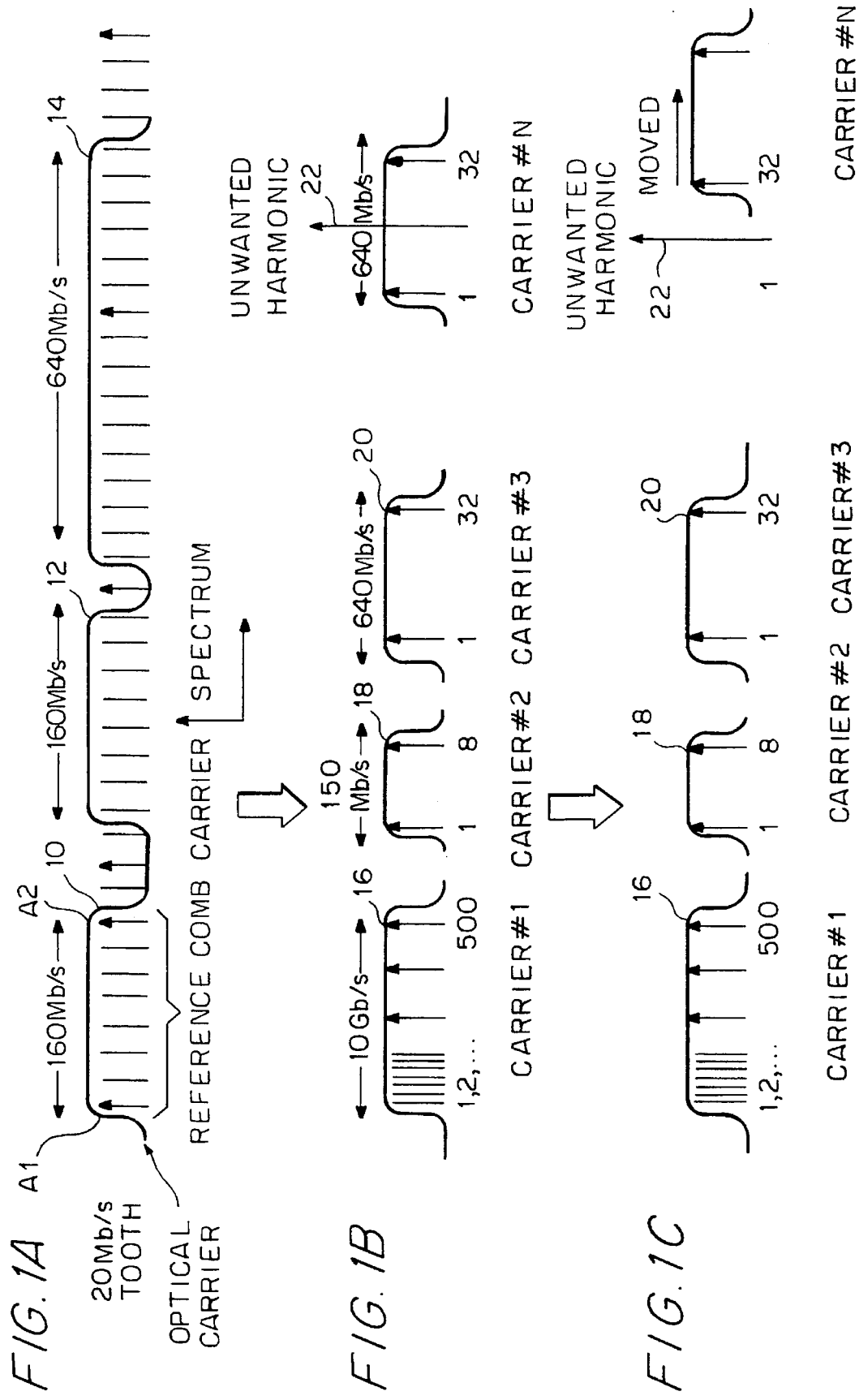
FIG. 1A is an optical carrier spectrum forming a comb.
FIG. 1B is an optical carrier spectrum employing a finer comb than that of FIG. 1A and showing the presence of unwanted harmonics overlapping the carrier.
FIG. 1C is an optical carrier spectrum with an added carrier falling outside the location of the unwanted harmonics in FIG. 1B.

FIG. 1A shows a conventional spectrum of carrier wavelengths 10, 12, 14 forming a comb comprising 20 MB/s teeth transmitted 160 MB/s over the span A1–A8 . By contrast, because of possible overlay of harmonics with the carriers as described previously, the present invention employs a finer comb of carriers 16, 18, 20 as shown in FIG. 1B. In the preferred embodiment the tooth comb is selected about 10 MHz finer that the usual 10 GHz comb of the conventional spectrum, thereby providing 500 teeth each offering 20 MB/s allowing 10 GB/s to be transmitted over the same optical bandwidth. FIG. 1B also shows an unwanted harmonic 22 overlapping the optical signal of carrier #N. The apparatus and method of the present invention enables the unwanted overlap to be removed with respect to existing carriers.

Once the carrier signals are transmitted, the content of the optical spectrum is examined by use of a wave or spectrum analyzer to derive a monitoring signal representative of the optical activity along the transmitting fiber. As will be further described hereinafter, the optical signal channeled through a coupler, is wavelength scanned by an optical bandpass filter. The resulting spectrum is read using a spectrum analyzer and the obtained optical spectrum compared with the desired spectrum of optical wavelengths allowed to be transmitted. If an interfering wavelength 22 is found, such as shown in FIG. 1B Carrier #N, the possible location of the respective optical channels is recalculated: the resulting fit modeled and verified. If the new "order" of optical channels location(s) is appropriate and if there are no damaging interferences, then a command is issued to the optical carriers to effect the calculated displacement so that the optical channel does not interfere with the new optical channel being selected. FIG. 1C shows the new location for the newly added channel N which now falls outside of the location of the interfering unwanted harmonic 22.

Figure 2:
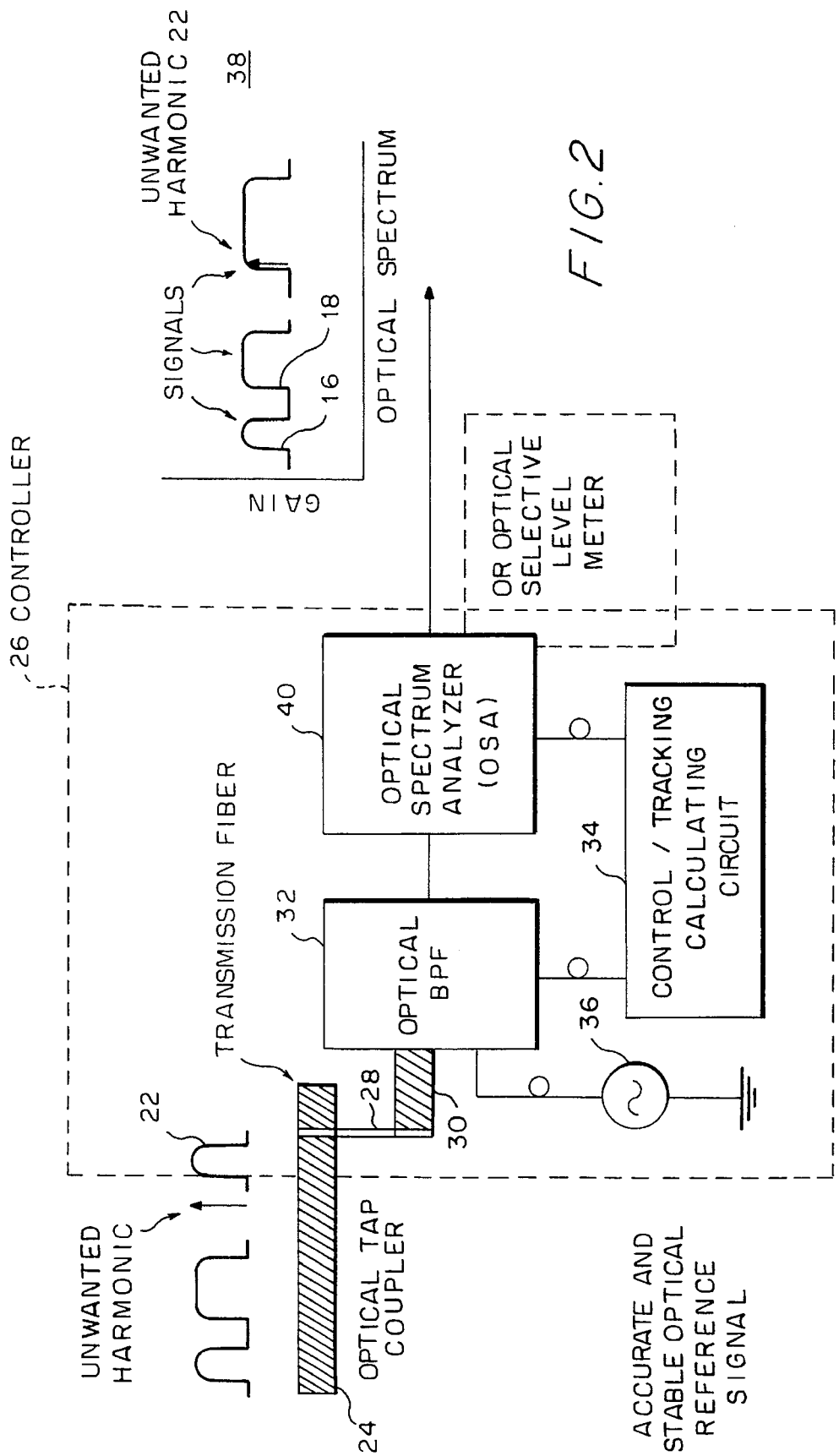
FIG. 2 is a block diagram of apparatus implementing the principles of the present invention.

FIG. 2 shows a preferred apparatus for carrying out the method of the invention described above. Transmission fiber 24 carries a multiplicity of optical channels 1–n–1 together with the possible unwanted harmonic(s) 22 generated by the interference of the higher order(s) of all the wavelength multiplexed optical channels. A controller unit 26 shown within the dotted area of FIG.2, includes an optical coupler 28 to divert a small part of the total optical signal as it travels through the fiber 24 and sends it, through an optical fiber 30 to the input of an optical bandpass filter 32. The optical coupler 28 is a directional coupler with high splitting ratio in the range of 95% to 5%, so that only a small part of the optical signal traveling along the main fiber 24 is tapped. The input signal coming out of the fiber from the optical coupler, is subdivided in wavelength components using a swept optical bandpass filter 32 driven by an optical sweeper control circuit 34 and equipped with a stable optical reference signal 36. The resulting family of wavelengths 38 is then evaluated using an optical spectrum analyzer 40.

The operation of the controller unit 26 will now be described conjunction with the flow diagram of FIG. 3, as follows:

In step 1, the controller unit 26 sweeps the bandpass filter 32 over the entire spectrum of interest, i.e. the useful optical spectrum available to the user of the fiber channel.

In step 2, the optical spectrum analyzer 40 or, alternatively, an optical selective level meter, plots the wanted optical signals 16, 18 . . . versus the unwanted optical signals 22, as shown in graph 38 in FIG. 2. The presence of unwanted signals is assessed. If unwanted optical signals are present, their location within the optical spectrum of interest is identified by the analyzer.

In step 3, using a table look-up of calculated interferences of optical signals based upon the well known relationship 2F(2)–F(1) or 2F(1)–F(2) or in general 2F(n)–F(m), where (m) and (n) may be interchanged 2F(n)–F(m), the amount of motion that the existing optical signals must move to remove them from the influence of the unwanted signal from the wavelength multiplexed optical spectrum is calculated.

In step 4, the results of the calculations of step 3, are used to recalculate the new optical spectrum to ensure that no new unwanted optical signals have been generated. If none are generated, then the controller 26 generates a control signal to shift the optical carriers within the optical frequencies tooth comb to be displaced with respect to harmonic interference effects. Since the system uses a very fine resolution optical tooth comb, the fine resolution channels can be selected to effectively move the carriers left or right along the comb to eliminate or work around such harmonic interference effects.

Due to the large number of carriers in the fine resolution comb, the information can be moved around the spectrum without sacrificing the total availability of optical channels. The present method and apparatus can also be used to assess if an allocated optical wavelength, or set of wavelengths, is free from unwanted harmonics or if a new channel has to be displaced because it was not possible to remove a harmonic by moving around all the other preexisting optical channels. In this fashion, it is possible to accurately optimize the use of an optical communication channel.

The controller 26 may be a portable tool with which, using a temporary coupler, the health of an optical communication line can be assessed to ascertain if unwanted harmonics are present and how they should be reallocated to optimize the optical line use. The controller can also be fully automatic or require some human intervention in establishing a new set of optical carriers. Thus the system provides a real time test of an optical communication channel. A pre-calculated value table associating the value of each character with the values of the comb can be generated, thereby enabling a step-wise granular selection of the comb spectrum. The system allows a more efficient use of the fiber optic communication link so that more optical channels can be sent concurrently without mutual difference.

While the present invention has been described in terms of the preferred embodiment for specific numbers of optical carriers in specific frequency bands, it should be evident to those skilled in the art that variations of the preferred embodiment may be practiced without departing from the scope of the invention. The invention should only be restricted as defined in the appended claims.

What is claimed is:

1. A method for communication over a plurality of narrowband optical channels arranging a plurality of optical carriers to avoid interference of unwanted harmonics between the optical carriers and information being transmitted on the plurality of optical carriers comprising:

a) generating a larger plurality of optical carriers using a finer tooth comb wherein the width of each tooth is less than the smallest modulation bandwidth being transmitted on the plurality of optical carriers;

b) defining which of said larger plurality of optical carriers results in harmonic interference;

c) selecting from said plurality of optical carriers a subset of optical carriers devoid of interfering harmonics; and d) transmitting communication information on said subset of optical carriers.

2. A method for communication over a plurality of narrow band optical carriers while avoiding unwanted harmonic interference occurring between the carriers comprising:

a) measuring the optical spectrum of the carriers in an optical fiber;

b) determining which of said carriers are involved in harmonic interference;

c) shifting the frequency of selected carriers to minimize the harmonic interference; and d) transmitting communication information on said selected carriers.

3. The method of claim 2 wherein the shifting of carriers is accomplished by generating a higher plurality of carrier wavelengths and selecting an optimal choice of said carriers.

4. The method of claim 2 wherein the shifting of carriers is accomplished by adjusting the locations of the carriers.

5. The method of claim 2 wherein the measuring of the optical spectrum is performed by a spectrum analyzer.

6. The method of claim 5 further including the step of deriving a monitoring signal representative of the optical activity along the optical fiber using the spectrum analyzer.

7. The method of claim 6 further including the step of scanning the monitoring signal for harmonic interference using an optical bandpass filter.

8. A system for modifying in real time the location of carriers in an optical carrier to avoid harmonic interference comprising:

a) means for supplying a spectrum of carrier wavelengths;

b) means for sweeping the entire spectrum of the carrier wavelengths for wanted and unwanted carrier wavelengths;

c) means for plotting wanted carrier signals versus unwanted signals in the spectrum;

d) means for tracking the unwanted carrier signals;

e) means for calculating the amount of spectrum that any or all of the carrier signals must move to avoid unwanted harmonics; and f) means for generating a control signal to change carrier frequencies of wanted carriers to avoid harmonics of unwanted carrier signals.

9. The system of claim 8 further including means for diverting a portion of the carrier wavelengths to the means for sweeping the carrier spectrum.

10. The system of claim 9 further including means for subdividing the spectrum of carrier wavelengths using a swept optical bandpass filter.

11. The system of claim 10 wherein the means for plotting wanted carrier signals is an optical spectrum analyzer or optical selective level meter.

12. The system of claim 11 further including means providing an optical reference signal for the optical bandpass filter.

* * * * *